United States Patent

Saban

[11] Patent Number: 6,043,867
[45] Date of Patent: Mar. 28, 2000

[54] TRACKING SYSTEM THAT INCLUDES MEANS FOR EARLY TARGET DETECTION

[75] Inventor: Izhak Saban, Kiryat Haim, Israel

[73] Assignee: The State of Israel, Ministry of Defense, Haifa, Israel

[21] Appl. No.: 09/072,304

[22] Filed: May 4, 1998

[30] Foreign Application Priority Data

May 5, 1997 [IL] Israel .................................. 120787

[51] Int. Cl.$^7$ .............................. G01C 3/08; G01B 11/26; F41G 7/00
[52] U.S. Cl. ....................... 356/5.01; 244/3.11; 244/3.17; 356/139.04
[58] Field of Search ................................ 244/3.13, 3.16, 244/3.11, 3.17; 356/4.01, 28, 139.04, 5.01

[56] References Cited

U.S. PATENT DOCUMENTS

| | | | |
|---|---|---|---|
| 5,197,691 | 3/1993 | Amon et al. | 244/3.13 |
| 5,340,056 | 8/1994 | Guelman et al. | |
| 5,374,932 | 12/1994 | Wyschogrod et al. | 342/36 |
| 5,379,933 | 1/1995 | Simeone et al. | 244/3.11 |
| 5,458,041 | 10/1995 | Sun et al. | 89/1.11 |
| 5,662,291 | 9/1997 | Sepp et al. | 244/3.11 |

FOREIGN PATENT DOCUMENTS

WO 96/35982  11/1996  WIPO.

OTHER PUBLICATIONS

Handbook of Pattern Recognition and Image Processing, Tzay Y. Young and King Sun Fu, 1986, pp. 222–225 and Reference No. 7 on p. 57, Academic Press, Inc.

Numerical Methods for Least Squares Problems, Society for Industrial and Applied mathematics, 1996, Philadelphia Linkoping, Sweden.

Modern Navigation Guidance and Control Processing, Ching Fang Ling, vol. II, Chapter 8, published by Prentice Hall.

Active Electro–Optical Systems, The Infrared and Electro–Optical Systems Handbook, Clifton S. Fox; vol. 6, Chapter 2, 1993, Enviromental Research Inst. of Michigan.

Primary Examiner—Stephen C. Buczinski
Attorney, Agent, or Firm—Knobbe, Martens, Olson & Bear LLP

[57] ABSTRACT

An interceptor fitted with a target tracker unit, that includes passive infrared tracker capable of sensing infrared radiation (IR) emitted from a flying target and being responsive to the sensed IR radiation, for generating a succession of Line of Sight (LOS) and/or LOS rates signals that are stored in a database. Self state means capable of providing a succession of interceptor's self state data. Electro-magnetic range finder that includes a transmitter assembly for transmitting pulsed radiations and receiver assembly for receiving reflections that surpasses adjustable detection threshold. The electromagnetic finder is configured to operate at first detection threshold for receiving reflections of relatively low magnitude, and storing the reflections in the database. A target reflection detection module communicating with the database, for detecting target reflections from among those stored in the reflection database. Estimator that includes range-based target estimator for calculating target state estimations on the basis of detected target reflections, the LOS measurements and self stage data, thereby facilitating early steering of the interceptor for duly homing said interceptor onto the target.

18 Claims, 9 Drawing Sheets

TRACKING SYSTEM THAT INCLUDES MEANS FOR EARLY TARGET DETECTION

FIELD OF THE INVENTION

The present invention is in the general field of tracking and homing target such as a tactical ballistic missile (TBM), by an interceptor missile that utilizes passive and active tracking means.

Whilst for simplicity, the present invention is described with reference to the specific example of intercepting tactical ballistic missiles (TBM) by an intercepting missile, the invention is, by no means, bound by this specific example. Passive tracking means in the context of the invention include, but are not limited to passive infrared (PIR) electro-optical seekers. Active tracking means in the context of the invention include, but are not limited to electro-magnetic range finder.

BACKGROUND OF THE INVENTION

There are known in the art techniques for intercepting targets by utilizing only PIR electro-optical seekers. A typical system that exploits solely passive means is described for example, in: "Ching Fang Ling; Modern Navigation Guidance and Control Processing, Volume II, Chapter 8.", published by Prentice Hall.

In a system of this kind, the interceptor is fitted with passive tracking means for detecting infrared radiation emitted from the target exhaust, or body.

The underlying concept of the tracking procedure is based on detecting the infrared (IR) radiation emitted from the target's plume and calculating therefrom the line of sight (LOS) towards the target.

After having obtained consecutive LOS measurements (and their derivative LOS rate measurements) the target's state is calculated. Target state, in the context of the invention, stands for at least target's position and velocity from among position, velocity and acceleration. Alternatively, in the context of the invention, target state stands for range and either or both of LOS and LOS rates measurements. For convenience, in the description below, whenever "LOS measurement" is referred to, it encompasses either or both of LOS measurements and LOS rates measurements, with respect to an inertial reference frame.

In the case under consideration, the target state in terms of a target's spatial position $\hat{x}$ (i.e. position (p), velocity (v) and acceleration (a) is calculated.

Due to the fact that no active tracking means are utilized, PIR tracking technique has an inherent advantage in that the interceptor is less vulnerable to detection and is less susceptible to counter measures activated by the target. However, and as is well known in the art, the PIR tracking is error prone to the extent that the resulting estimated spatial position of the target is not of sufficient accuracy. Due to the accumulated error in estimating the target's spatial position, the target e.g. TBM, may be missed by the interceptor which may result in leakage of the TBM towards friendly territory, with an inevitable dire consequence.

Thus, when considering a target that flies at a relatively high velocity (such as air-to-air missile, or tactical ballistic missile that has gained sufficient velocity after boost phase), then the utilization of solely PIR tracking means will not bring about estimation of the target's spatial position at the desired high accuracy.

One possible approach of enhancing the accuracy of the estimated target's spatial position is by integrating active tracking means such as known per se laser range finder (LRF).

Detailed discussion of laser finders can be found in e.g. "Clifton S. Fox; Active Electro-Optical Systems", "The Infrared and Electro-Optical Systems Handbook" Volume 6, Chapter 2, 1993, published by "Infrared Information Analysis Center", Environmental Research Institute of Michigan Ann Arbor, Mich. USA.

Generally speaking, LRF includes a laser transmitter capable of generating and transmitting a beam of radiation that strikes the target, and the reflected portion of said radiation that is scattered from the target, is partially collected by a receiver that forms part of the LRF. On the basis of the elapsed time between transmitted and received radiation, the range to the target may be determined with a relatively high degree of accuracy.

The determined range and the LOS measurements (acquired from the passive tracking means) enable to derive the spatial position of the target far more accurately, and accordingly the risk of missing the target is significantly reduced.

A laser range finder has however an inherent drawback in that in a so called terminal phase tracking, (and in particular in distances of more than about 3 km from the target,) the reflected radiation (i.e. "signal") and clutter (i.e. "noise") are not easily discerned, one with respect to the other, due to low signal to noise ratio.

Accordingly, the incorporation of accurate target range measurements as derived from the LRF, may be utilized only at a relatively late stage of the interception phase, which in some cases, may prohibit timely steering of the interceptor for successfully homing onto the target, bearing in mind the inherent slow operation of the steering mechanism and that at this late stage, both the interceptor and the target flying at very high relative velocities (referred to as "closing velocity"). Thus, by way of example, for intercepting TBM at high altitude in an head-on trajectory, a typical closing velocity may exceed 3000 m/s.

It is accordingly the object of the present invention to obtain preliminary detection of the target by utilizing LRF even under low signal to noise prevailing conditions, and to thereby enhance the likelihood of timely steering the interceptor so as to enhance the probability of successful homing onto the target.

It is a specific object of the present invention to obtain improved probability of homing at the target when a laser range finder of the kind specified is fitted in an interceptor missile designate to destroy tactical ballistic missiles that are launched towards a friendly territory.

SUMMARY OF THE INVENTION

The invention exploits passive tacking means that includes passive infra Red (PIR) assembly, fitted in an interceptor, capable of sensing infrared radiation emitted from a flying target and generating therefrom LOS and/or LOS rates measurements. Preferably, said passive tracking means further utilizes passive tracking estimator responsive to said LOS measurements, for generating LOS based target state estimations (TSE).

The interceptor further exploits active tracking means that include electro-magnetic range finder, preferably, LRF assembly that includes a transmitter for transmitting pulsed radiation and a receiver for receiving reflections.

In a conventional hitherto known operation of an LRF, the range to target is calculated in response to receipt of radiation reflected from the target. The latter event occurs when the magnitude of a received signal surpasses a preconfigured threshold level (hereinafter "normal detection threshold"), indicating, thus, that the received signal being a reflected radiation from the target (i.e. normal target detection event) and not a clutter signal. The threshold level corresponds, thus, to the LRF's operative signal to noise ratio (hereinafter S/N), which will be regarded as distinguishing between sought reflections from target and noise signals. In this context, "signal" stands for the sought radiation reflected from the target and "noise" stands for clutter and/or other interferences.

Put differently, reflections which surpass the threshold are deemed as reflections from target (referred to as sought reflections or target reflections), whereas those that do not surpass the specified threshold are deemed as noise. Typically, said normal detection threshold corresponds to S/N that is larger than 6.

Of course, the closer the interceptor to the target, the higher is the magnitude of the received reflected radiation from the target, and on the basis of this assumption a high threshold level necessarily delays the target detection event and consequently decreases the range to target and obviously the remaining time-to-hit. A short time-to-hit, may not leave ample time for completing the steering operations as performed by the inherently slow steering mechanism of the interceptor, in order to successfully home the interceptor onto the target.

Reverting now to a normal target detection event, (i.e. responsive to reflected signal that surpasses the normal detection threshold), this triggers the calculation of the range-to-target on the basis of the elapsed time between transmission of radiation and the receipt of reflected portion thereof.

Having calculated range to target in the manner specified, and on the basis of the LOS (and/or LOS rates) measurements obtained from the passive tracking estimator, an appropriate means that includes a target range estimator can determine an estimated target's state, in order to duly steer the interceptor for accomplishing successful homing onto the target. Thus, by way of example, in the case of intercepting TBM, the interceptor missile should be as close as about 3 km from target in order to receive reflected radiation of sufficient magnitude, so as to bring about a "target detection" event.

As is well known, as the interceptor further approaches the target, improved range calculations and improved estimated LOS measurements are obtained (and stored in respective reflection database and LOS database), thereby giving rise to more accurate target state estimations.

Whilst improved target's states are continuously obtained, the time-to-hit keeps decreasing, which as explained may eventually increase the probability of missing the target.

The present invention attempts to cope with this shortcoming by altering the operation of the LRF and adding some additional means, as will be explained below.

Thus, according to the invention, the specified threshold of the laser range finder is significantly lowered as compared to said normal detection threshold, e.g. to a value that corresponds to S/N that resides in the range of 1 to 2. The lowered S/N will obviously result in generation of plurality of seemingly "target detection events" in response to receipt of respective reflections having, each, a magnitude that surpasses the lowered threshold. Many of these reflections constitute, of course, false alarms, i.e. clutter and other interferences.

The received reflections are stored in a reflections database and are subject to pattern recognition analysis in order to detect those reflections that scatter from the target (the sought reflections or target reflections) whilst discarding the others.

A typical, yet not exclusive, pattern recognition analysis technique that may be exploited to this end is the so called Hough technique, described in detail in Tzay Y. Young and King Sun Fu, "Handbook of Pattern Recognition and Image Processing", 1986, pp. 222–225 and Reference No. 7 on page 57. As will be explained in greater detail below, whenever required, further refinements may be performed.

The pattern recognition (PR) analysis, normally, gives rise to detection of the specified sought reflections at a relatively early stage of the terminal phase interception. As will be explained in greater detail below, the PR analysis does not necessarily bring about perfect classification, i.e. there still remains some degree of uncertainty as to whether a given reflection is indeed a target reflection or noise. Notwithstanding the above, the level of uncertainty after applying the PR analysis is significantly reduced in the sense that many reflections are not regarded anymore as target reflections and are therefore discarded insofar as future computations are concerned. As is well known, the PR analysis search for a given pattern from among the stored reflections. In the case under consideration, the PR analysis attempts to detect essentially straight line in the graph that represents the stored reflection in terms of calculated range-to-target (ordinate) vs. time from first triggering (abscissa).

This preliminary target detection event precedes the specified "normal target detection" event due to the use of the proposed technique of the invention. In other words, due to the preliminary target detection, when using the technique of the invention, the range-to-target (hereinafter early target detection range) is larger than what would be the range-to-target (hereinafter normal detection range) should said conventional "normal detection threshold" be used as a criterion for target detection. In the case of TBM, said normal detection range is approximately 3 km from the target whereas said preliminary detection range is approximately 4 km. It should be noted that the specified ranges are provided for illustrative purposes only and their value may differ depending upon various factors such as seeker's optical closure, LRF transmitter's power, receiver sensitivity and many others, all as required and appropriate.

Of course a larger range-to-target increases the corresponding time-to-hit.

Having encountered early target detection (albeit not in perfect level of certainty), there commences now a back propagation analysis for picking up previous target reflections from among the reflections stored in the reflections database, on the basis of at least expected closing velocity and expected range to target, so as to bring about a series of target reflections.

Next, from the series of target reflections that were detected by using the back propagation procedure, it is possible to obtain respective range-to-target indications on the basis of elapsed time between the transmitted radiation and the time of receipt of said target reflections, utilizing, to this end, said reflection database. The so obtained series of range-to-targets start from a very early terminal interception phase, e.g. from the point where the laser finder has virtually started receiving target reflection.

The series of accurate ranges along with the corresponding LOS (and/or LOS rates measurements), as retrieved from the LOS database, and corresponding self state data, as obtained from self state database are fed to means that includes a range-based target-state-estimator (TSE) capable of calculating corresponding relatively accurate target state estimations.

It should be noted that the back-propagation analysis as well the calculation of the target state estimations which follow said early target detection event, require only a fraction of a second, with the consequence that at a relatively early terminal interception phase (e.g. in the specific example under consideration, at a range of about 4 Km from the target), fairly accurate target state estimations are available, thereby enabling appropriate steering of the interceptor so as to accomplish successful homing onto the target, which will eventually result in increases in the probability of intercepting the target. Conversely, obtaining a preliminary target state output at the specified normal target detection range (e.g. 3 Km from the target), and thereafter obtaining improved target state output as the interceptor further advance towards the target.

The net effect of the preliminary target detection and the resulting early target state estimations as offered by the invention is, therefore, enhancing the probability of successfully homing the interceptor onto the target.

Accordingly, the invention provides for an interceptor fitted with a target tracker unit, comprising:

a passive infrared tracker capable of sensing infrared radiation (IR) emitted from a flying target and being responsive to said sensed IR radiation, for generating a succession of Line of Sight (LOS) and/or LOS rates signals that are stored in a database;

self state means capable of providing a succession of an interceptor's self state data;

an electro-magnetic range finder that includes a transmitter assembly for transmitting pulsed radiations and a receiver assembly for receiving reflections that surpass an adjustable detection threshold;

said electro-magnetic finder being configured to operate at a first detection threshold for receiving reflections of relatively low magnitude, and storing said reflections in said database;

a target reflection detection module communicating with said database, for detecting target reflections from among those stored in said reflection database;

estimator that includes range-based target estimator for calculating target state estimations on the basis of at least said detected target reflections, said LOS measurements and said self state data, thereby facilitating early steering of the interceptor for duly homing said interceptor onto the target.

If desired said range estimator is further responsive for target behavior constraint, which in one example is that the target flies along essentially a straight trajectory.

The present invention further provides for a target tracker unit of the kind specified for use in an interceptor.

BRIEF DESCRIPTION OF THE DRAWINGS

For a better understanding, the invention will now be described, by way of example only, with reference to the accompanying drawings, in which.

DESCRIPTION OF SPECIFIC EMBODIMENTS

Figure 1:
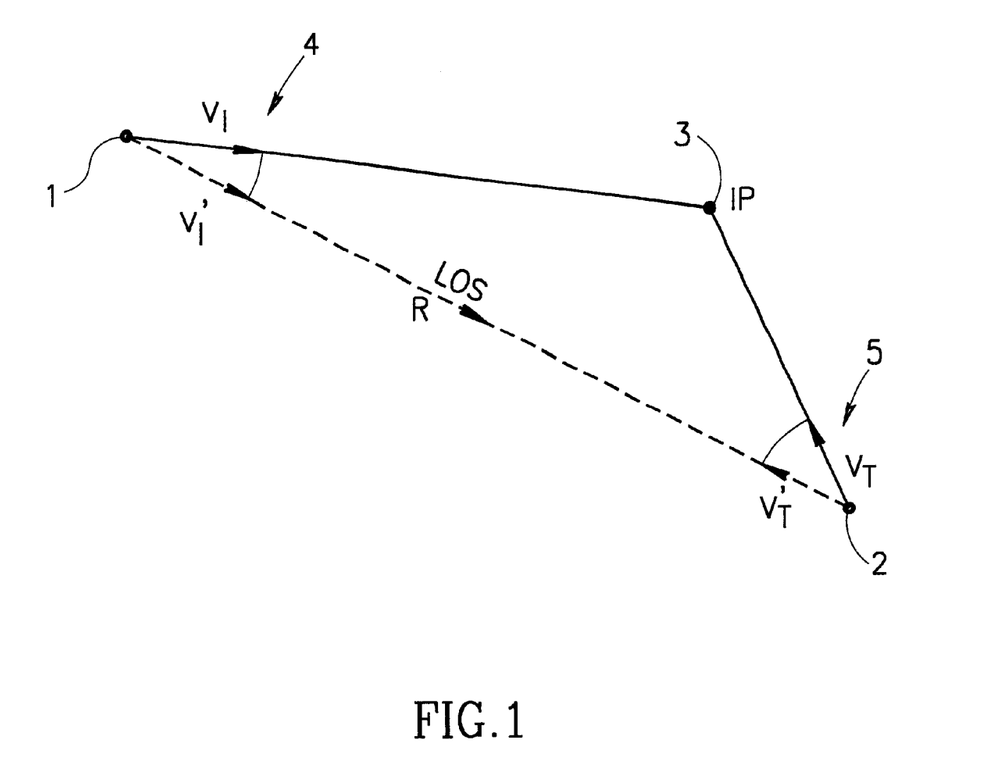
FIG. 1 is a simplified graphic representation of an interception scene illustrating the relative geometry between the interceptor and the target.

Attention is first directed to FIG. 1 showing a simplified graphic representation of an interception scene illustrating a relative geometry between the interceptor and the target. Thus, the interceptor (1) attempts to intercept target (2), at a future interception point (IP), designated generally as (3). As shown, the interceptor advances at velocity $V_I$ and the target advances at velocity $V_T$. $V_I'$ is the interceptor's velocity along the LOS between the interceptor and the target and $V_T'$ is the target's velocity along the LOS. "Closing velocity" in this context is defined, vectorial, as $V_T'+V_I'$.

Figure 2:
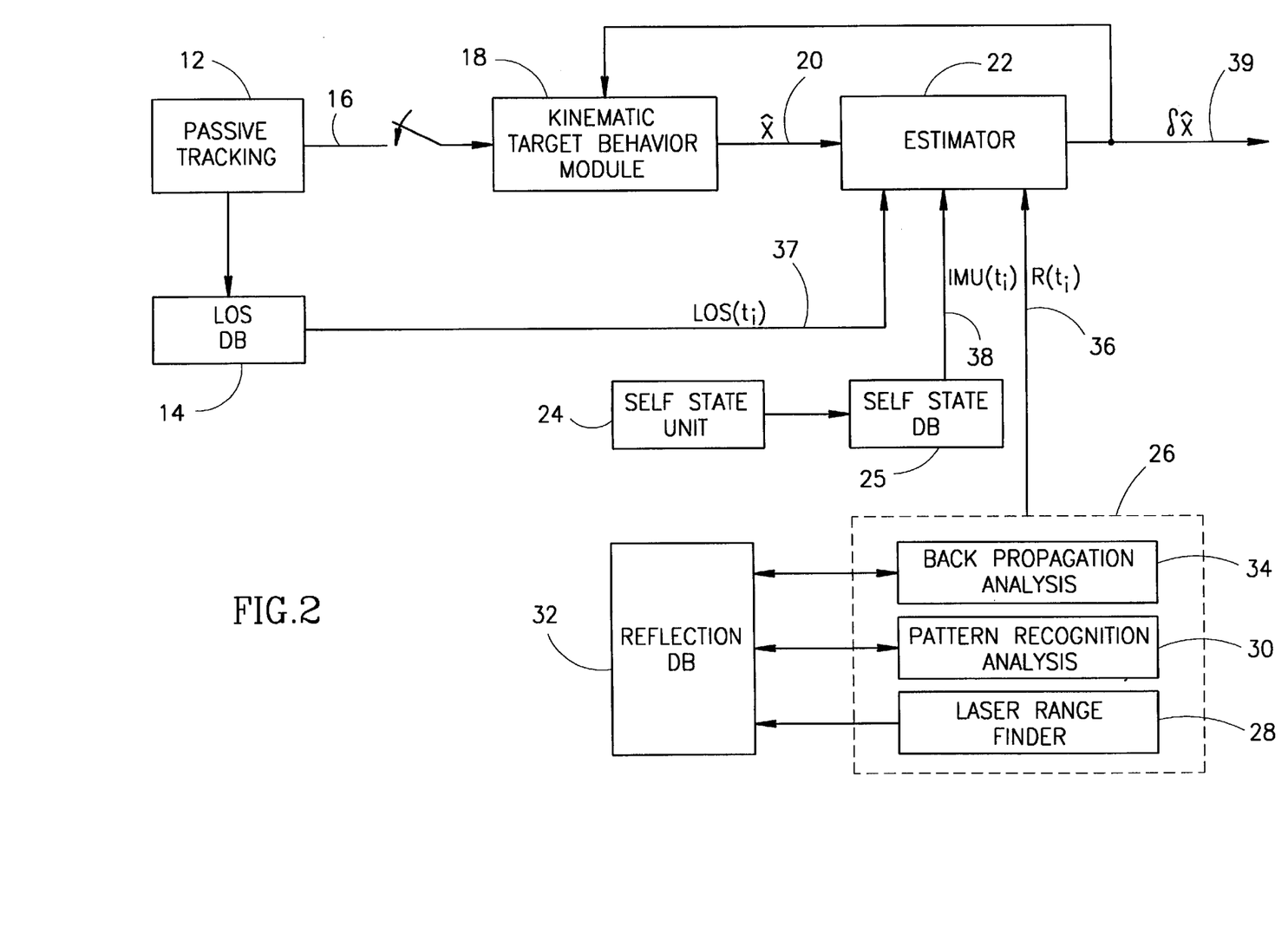
FIG. 2 is a simplified block diagram illustrating a tracker system, according to one embodiment of the invention.

Turning now to FIG. 2, there is shown a simplified block diagram illustrating a tracker system, according to one embodiment of the invention. The tracker system is normally fitted in an interceptor missile, e.g. air-to-air missile that is launched towards the target, e.g. from a fighter aircraft or an unmanned vehicle. (not shown in FIG. 2).

A typical system that exploits an intercepting missile of the kind specified is described e.g. in U.S. Pat. No. 5,340,056 Guelman et al., and in WO 96/35982, whose contents are incorporated herein by reference.

As shown, tracking system 10 includes passive tracking unit 12 that normally includes a PIR electro-optical seeker for collecting IR radiation emitted from the target and for deriving LOS and LOS rates measurements towards the target. Optionally, the passive tracking unit 12 further includes associated LOS based Target State Estimator (TSE), for estimating target state on the basis of the measured LOS and/or LOS rates.

The structure and operation of a passive tracking unit is generally, known per se, (see for example FIG. 8-2 of Ching-Fang Lin ibid.), and will therefore not be further expounded upon herein.

The so obtained LOS (and/or LOS rates) measurements as well as other pertinent data, e.g. the respective measurement time of the LOS measurements/and or LOS rates measurements are stored in LOS database 14.

LOS measurements 16 as delivered from unit 14, is fed to known per se kinematic target module 18 which, on the basis of measured LOS measurements, is capable of calculating a target's state estimation, which by this particular embodiment stands for the target's spatial position (P,V,A). The kinematic target behavior model complies with, e.g. the following algorithmic expression:

$$P(t_K)=P(t_{K-1})+V(t_{K-1})\cdot(t_K-t_{K-1})+\tfrac{1}{2}A(t_{K-1})\cdot(t_K-t_{K-1})^2 \qquad (1)$$

As is well known, equation 1 is only one variant for realizing the target kinematic model. It should be noted that at the onset preliminary P,V, and A estimations may be provided e.g. from the LOS based TSE.

As shown in FIG. 2, the estimated spatial position data 20 that is delivered as output from kinematic target behavior module 18, are, of course, inaccurate at this early stage, since it is based predominantly on the inherent noisy LOS measurements.

Data 20 is fed to an estimator module designated generally as 22. The latter module includes range-based TSE and a more detailed description of module 22 is given with reference to FIG. 4, below.

Turning back to FIG. 2, as shown, the range-based TSE 22 is also fed with:

(i) self state data $X(t_i)$ (i.e. self location data at time $t_i$) from self state database 26 that stores data continuously fed thereto by a known per se self-state unit, e.g. inertial unit 24.

(ii) range data $R(t_i)$ (i.e. range data at time $t_i$) that is provided from range module 26, and (iii) LOS measurement $LOS(t_i)$ (i.e. LOS measurement at time $t_i$), as retrieved from LOS measurement base 14.

The provision of the range data from module 26 will now be explained. As specified before, a conventional laser rage finder 28, e.g. of the kind disclosed in Fox ibid., is configured to a relatively low threshold level and starts to receive reflections at a very early stage of the terminal interception phase.

Figure 3:
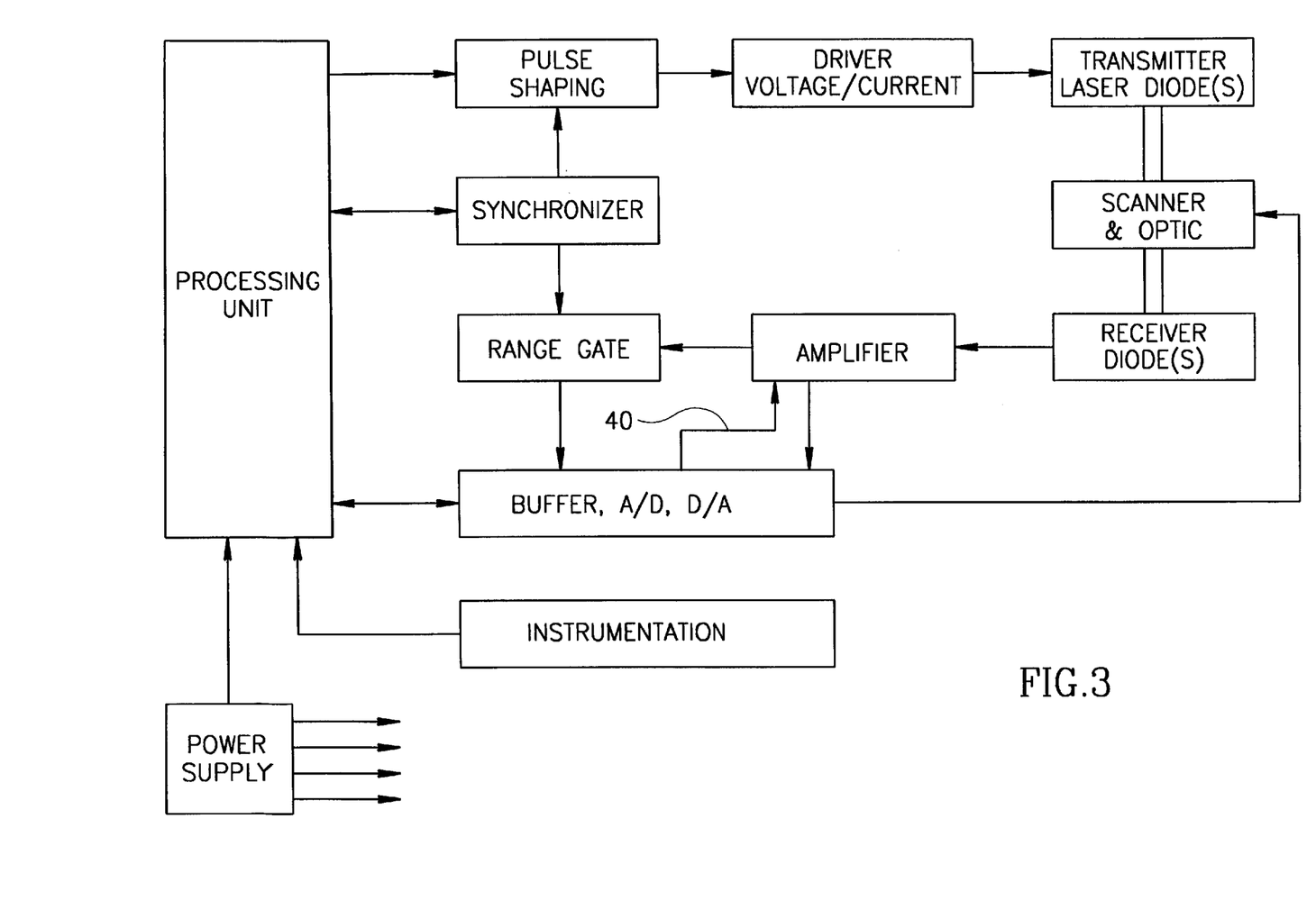
FIG. 3 is a block diagram of one embodiment of a laser range finder that is used in a tracking system according to the invention.

FIG. 3 illustrates an exemplary LRF which is essentially functionally the same as disclosed in Fox ibid. Since the operation of the LRF of the kind specified is generally known per se, it will not be expounded upon herein except for designating control line 40, which serves for threshold setting.

As specified before, the received reflections consist of both target reflections (i.e. reflections that were scattered from the target) and noises such as clutters whose magnitude exceeded the specified lowered threshold. The collected reflections are stored in reflections database 32, along with their respective time tags. The transmissions originated from the laser range finder 28 are also stored in database 32 along with their respective time tags.

After having received sufficient reflections, the operation of PR analyzer module 30 is triggered for detecting from among the reflections that are stored in the database 32, those that were scattered from the target (i.e. target reflections). A typical, yet not exclusive, technique that is utilized to this end is the Hough Algorithm described in Young, Fu, ibid., Said detection is based on at least the approximated closing velocity and approximated range. In other words, the Hough algorithm receives as input closing velocity and range estimations, e.g. preliminary and inaccurate estimations as derived from the LOS based TSE. The closing velocity determines the inclination of a searching window that is utilized by the Hough algorithm.

During operation, the Hough algorithm need not be fed with additional closing velocity and range estimations, but rather in the process of eliminating noise reflections and focusing on target reflections (from among those stored in the database), it calculates an improved closing velocity.

The operation of the PR analyzer gives rise to the so called early target detection and the calculation of the corresponding range to target $R(t_d)$ (where $t_d$ stands for the instant of detection). In other words, the pattern analyzer is capable of detecting reflections from target despite their relatively low magnitude as compared to the received noise, whereas according to conventional laser range finding technique a priori high S/N ratio is required in order to differentiate between target reflections and clutter.

As will be explained below, the Hough algorithm does not normally succeed in unambiguously classifying the range, but rather to obtain a fairly accurate estimation of the range. Put differently, some reflections whilst being classified as target reflection may nevertheless originate from noise.

Improved range estimations may be obtained e.g. by applying back propagation techniques.

Turning back to estimator module 22, on the basis of:

(i) the so obtained range data $(R(t_d)$ as delivered from the pattern analysis module 30;

(ii) the corresponding LOS measurement $LOS(t_d)$, i.e. LOS measurement at instant $t_d$, obtained from the LOS database; and (iii) the interceptor self location data $X(t_d)$ as obtained from self location database 25, the estimator 22 can determine the error in the input spatial position $\delta P, \delta V, \delta A$ i.e the error in the input estimated target spatial position P,V,A, as delivered from the kinematic target behavior module 18.

The so obtained error $\delta P, \delta V, \delta A$, is, as shown, fed to the target kinematic behavior module for improving the estimated spatial position.

Having encountered an "early target detection" event by applying the PR analysis, there commences a back propagation analysis (in module 34) for picking up previous target reflections from among the reflections stored in the reflections database 32 on the basis of at least closing velocity and range to target as obtained from the PR module, so as to bring about a series of target reflections.

The operation of the back-propagation module, will be explained in greater detail below.

Next, from the series of target reflections that were brought about by using the back propagation module 34, it is possible to obtain respective range-to-target indications $R(t_i)$ starting from the very early terminal interception phase, and in some cases from the point where the laser finder has virtually started receiving reflections from the target.

Thus, the series of accurate range data 36 as delivered from the back propagation analysis module 34, the corresponding LOS measurement 37 (and/or LOS rates measurements) as extracted from the LOS database 14 and self state data 38 as extracted from self state database 25 (which is fed with data from unit 24, such as inertial measurement unit—IMU), are all fed to estimator 22. Estimator 22 is capable of calculating interactively errors in target state estimations 39 that are fed to kinematic target module 18 for obtaining yet further improved target state estimations. It should be noted that unit 24 may be placed on-board, or if desired the specified self state data may be communicated to the database from external source, in a known per se manner.

In this iterative manner the target state estimation $\hat{x}$ is continuously updated to give rise to new target state errors $\delta \hat{x}$ that, in turn, serve for obtaining yet better target state estimation $\hat{x}$.

It is important to note that the specified iterative procedure utilizes "historical data" as retrieved from the database and as analyzed post factum in order to continuously improve the target state estimation, whilst the interceptor missile is still flying in an early terminal interception phase.

Figure 4:
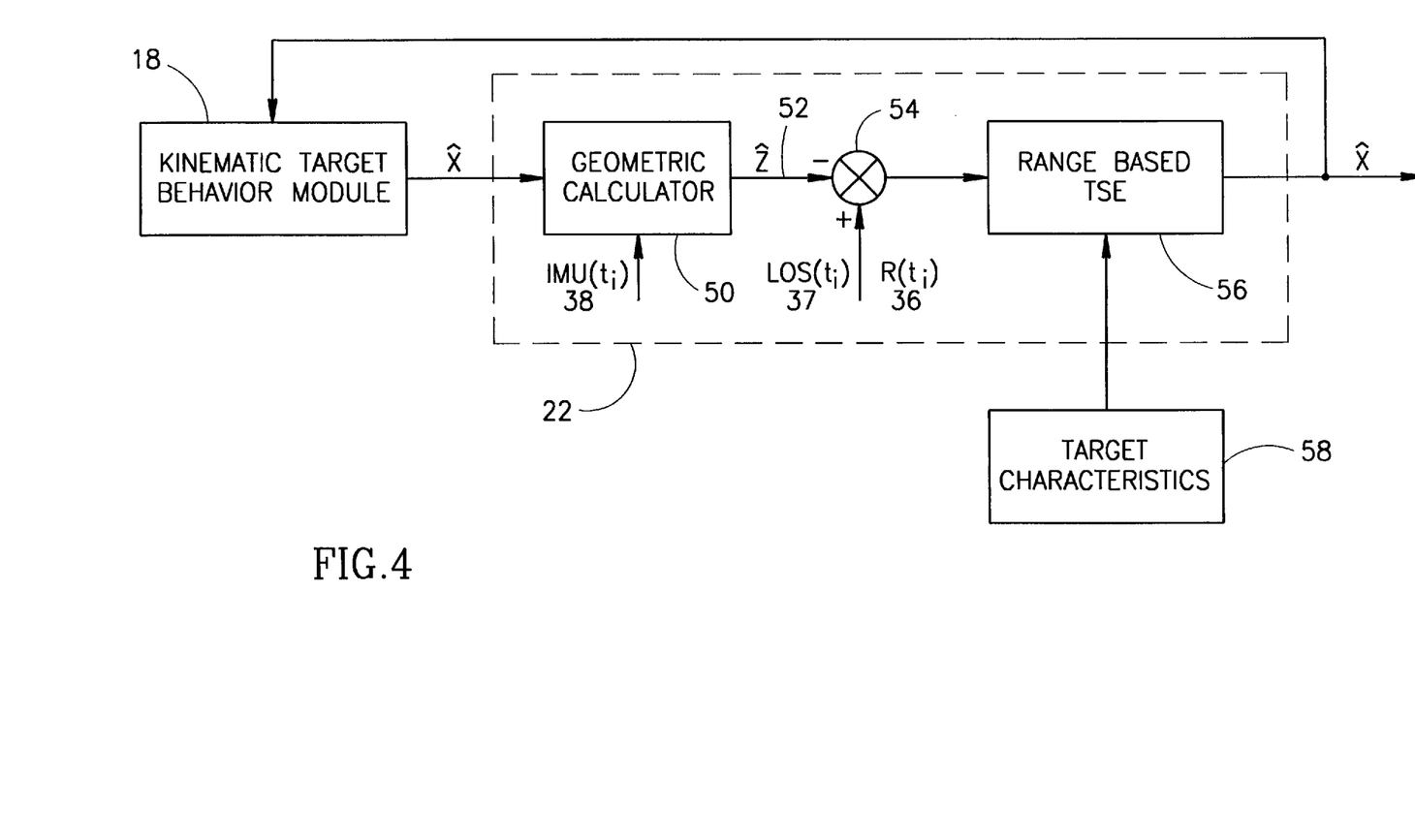
FIG. 4 is a more detailed block diagram of the various modules that constitute the range target estimator.

Attention is now directed to FIG. 4, showing a slightly more detailed structure of the estimator 22 that is illustrated in FIG. 2.

Thus, the target state estimation $\hat{x}$ (20) as delivered from kinematic target module 18, is fed to estimator 22 which includes known per se geometric calculator 50 that converts the target state estimation $\hat{x}$ to LOS and range representation designated collectively as $\hat{z}$.

The $\hat{z}$ data 52 obtained from the geometric calculator module is fed as a negative feedback to measured LOS measurements and range data in adder 54, and the resulting difference is fed to ranged-based target state estimator (TSE) 56 so as to yield in a known per se manner the specified error $\delta\hat{x}$. The operation of the range-based TSE 56 is generally known per se as disclosed e.g. Bar-Shalom Y. and T. E. Fortmann, "Tracking and Data Association" Academic Press, Inc. 1988. By this particular example, the specified estimator is based on a Kalman filter estimator. Other estimators which comply with the functional operation of the range-based TSE 56 are, of course, applicable, all as required and appropriate.

Having described, generally, the structure of a tracker system according to one embodiment of the invention, a detailed description of a sequence of operation of the system will now follow.

Figure 5:
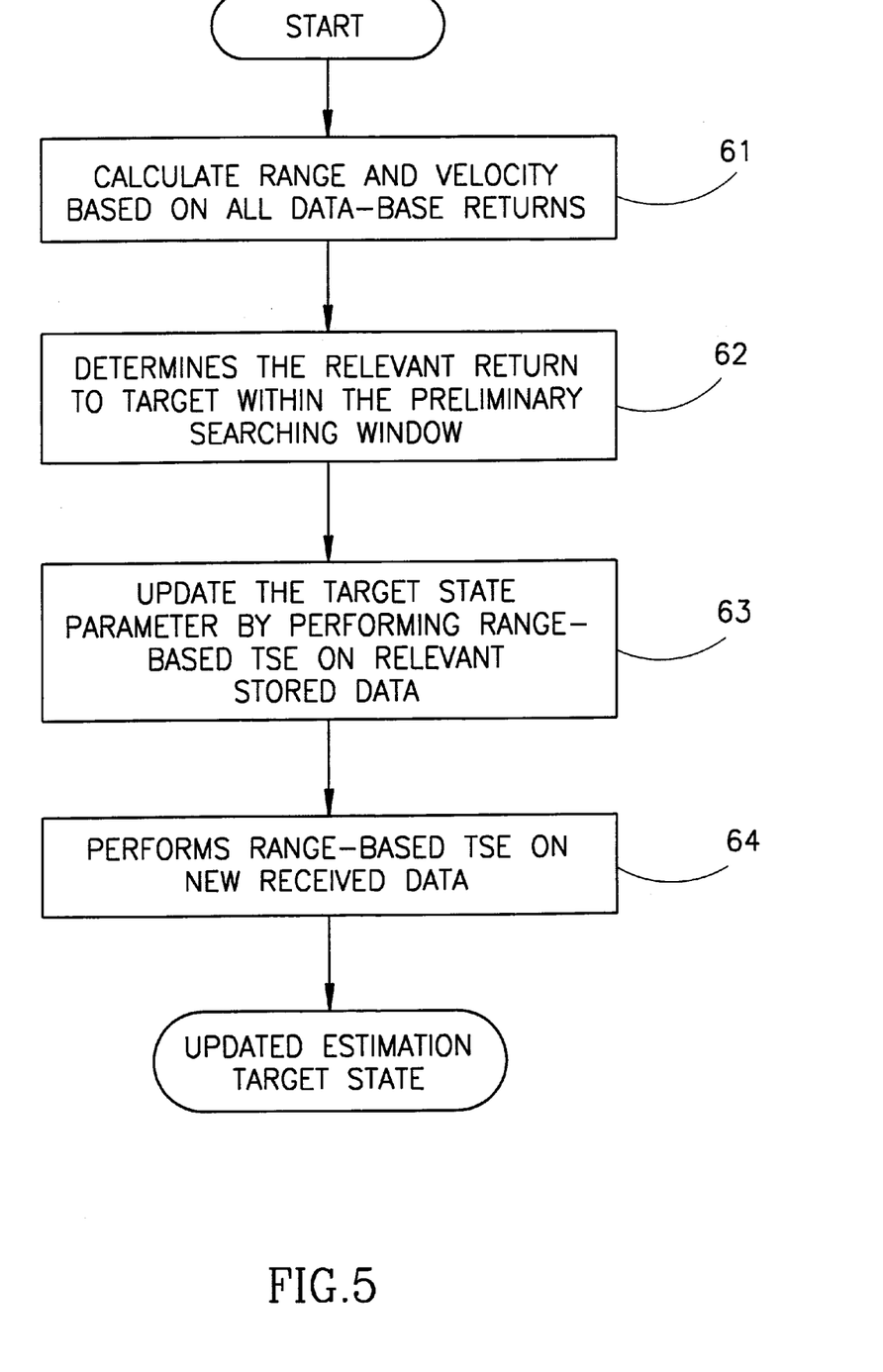
FIG. 5 is a simplified block diagram illustrating, generally, the various operational stages of tracker system, according to one embodiment of the invention.

For a better understanding, we start with a general functional operation of the system, with reference also to FIG. 5.

Thus, after having acquired sufficient reflections that are stored in a database, a pattern recognition (PR) analyzing step is applied (61), in order to detect target reflections, i.e. the specified early target detection.

As explained before, the PR analysis does not necessarily result in unique classification of a given reflection as a target reflection but rather decreases the uncertainty as to those reflections which are deemed as target reflection.

Having completed the PR analysis, there commences a back-propagation step (62) for picking up previous target reflections from among those stored in the reflection database. After applying this step a series of target reflections (and their corresponding range-to-target data) are obtained starting from a very early terminal interception phase.

Next, and as shown in step (63), there commences a target estimation which is range-based TSE, utilizing successively the series of target reflections as produced by the back-propagation step, their corresponding LOS measurements and corresponding self state data, where the LOS measurements and corresponding self state data are obtained from the database. This step will result in fairly accurate target state estimations whilst the interceptor is still at sufficient distance from the target.

The following step (64) simply describes the following "forward" processing, i.e. transmission of next pulse; receipt of next reflection, and applying the analysis in order to classify it as target reflection, utilizing also the corresponding LOS measurement, as obtained by the PIR electro-optical seeker, and the corresponding self state data as obtained from the IMU, for updating the target state accordingly, utilizing of course the range based TSE and the target kinematic behavior model.

The present invention is, by no means, bound to the sequence of operation as prescribed by the block diagram depicted in FIG. 5. Thus, by way of example, steps 62 and 63 may simply be skipped, i.e. after having encountered early target detection (albeit not with perfect level of certainty), the "forward" calculation commences. By yet another non limiting variant, only step 63 may be skipped, i.e. after applying the back-propagation, target state estimation is applied only to the most recent range that correspond to $t_D$, and thereafter the forward calculation is commenced. Other possible modifications which involve modification of existing steps and/or deletion of existing steps and/or adding new steps are applicable, all as required and appropriate, depending upon the particular application.

Figure 6:
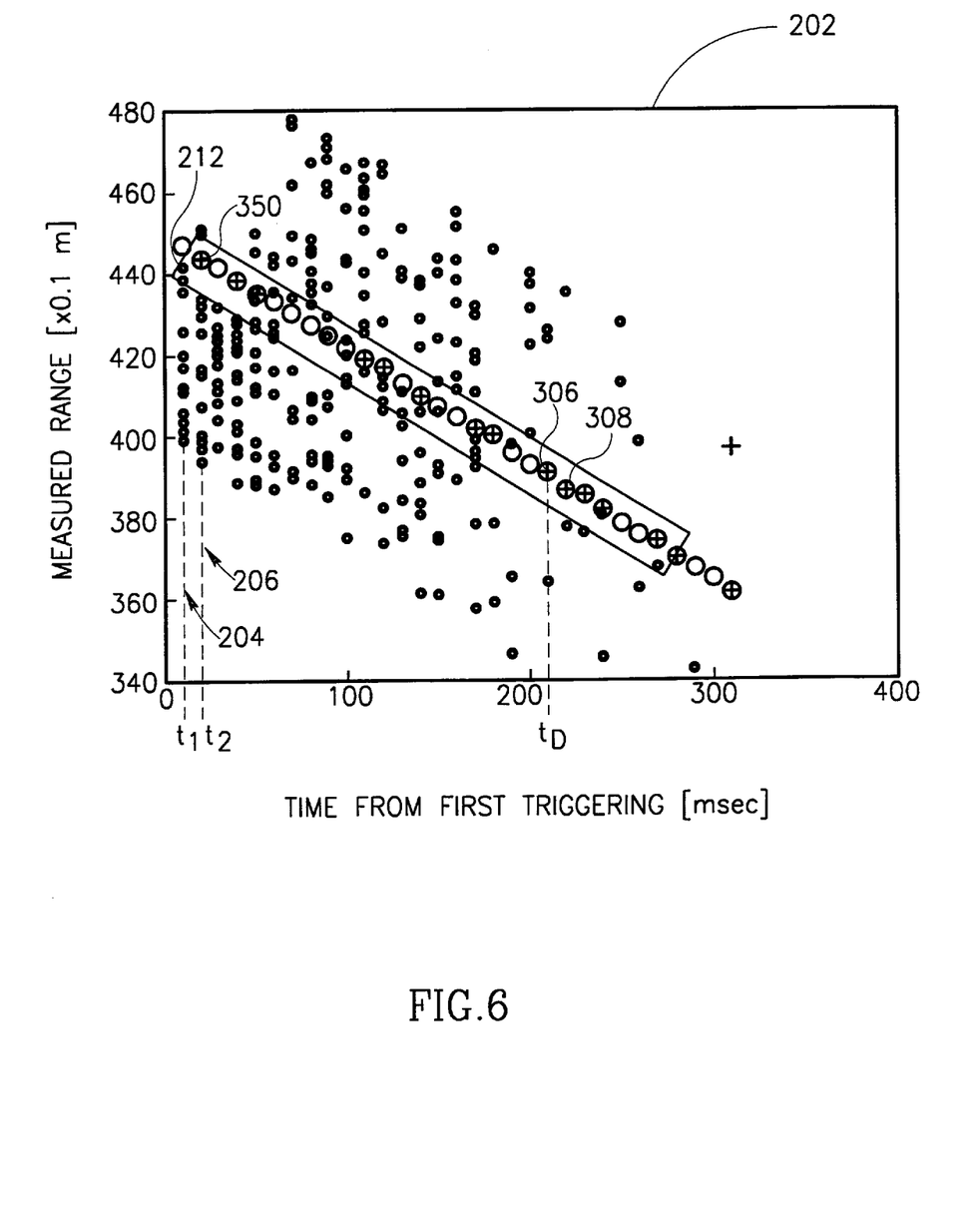
FIG. 6 is a graph representation of received reflections depicted as calculated range-to-target (ordinate) vs. time from first triggering (abscissa).

The generalized procedure described with reference to steps 61–64 above, will be better understood when referring also to the graphical representation of stored reflections as depicted in FIG. 6

As shown, a plurality of reflections 202 are stored in the database, each with its associated time tag. Thus, a plurality of reflections all received at essentially a first time $t_1$ are designated collectively as (204) and, likewise, a plurality of succeeding reflections all received at a second time $t_2$ are designated collectively as 206. Since the transmitted signals are transmitted at discrete terms (due to the pulsed radiation transmitted from the laser), the target reflections are essentially synchronized therewith and are also received at discrete intervals. $t_2-t_1$ essentially equals the time interval between succeeding pulses.

The timing of other reflections that are stored in the reflection database (and which originate from noise) do not normally coincide with the timing of received target reflections since, unlike target reflection, the noise reflection are not synchronized with transmitted LRF pulses. However, and as is well known in the art, LRF is normally configured to receive radiation from ranges of $R\pm\Delta R$, where $\Delta R$ correspond to a time interval that is significantly smaller than the elapsed time interval between successive pulse transmissions, and accordingly all the reflections that are designated collectively as (204) seemingly appear to be received on the same time interval $t_1$. Of course, this is only rough approximation and preferably the reflection data base holds with respect to each received reflection its precise time tag.

Bearing this general comment in mind we revert to the description with reference to FIG. 6.

Thus, and as specified before, due to the lowered threshold configuration of the LRF, most of the received reflections account for noise. This is clearly illustrated in FIG. 6, where many reflections (e.g. those designated collectively as 204) are received at about the same time $t_1$, where, obviously, only one of them may originate from target reflection and the rest are simply noise. The same holds true to the plurality of reflections designated collectively as 206, i.e. only one of which may originate from a target reflection, and so forth for the remaining signals received at essentially timing $t_3, t_4, \ldots t_n$.

As shown in FIG. 6, the Hough algorithm (that constitutes the PR procedure designated 61), utilizes a relatively "narrow" search window (210) based on closing velocity as preliminarily provided by the LOS based TSE, or by other means should LOS based TSE, is not used. The utilization of "narrow" search window obviously diminishes the number of possible candidates that constitute a target reflection. Thus, for example, from among the plurality of reflections, all designated as 204, only those designated as 212 fall in the Hough searching window. The Hough algorithm brings about detection time $t_D$ (214) constituting said early target detection.

Although in FIG. 6, a given reflection (300) was unequivocally classified as target reflection, this is not necessarily always the case, i.e. when the Hough algorithm completes operation there is still more than one reflection that is suspect to be a target reflection. In this case other fine tuning techniques such as a back-propagation procedure may be exploited, in order to uniquely identify target reflection.

Next, the back-propagation step (62) is applied in order to pick-up in the database all the previous target reflections. As shown in FIG. 6, the previous target reflections being all the encircled "reflections" starting as early as reflection 350

(received at time $t_1$) and ending at reflection 300 where the latter constitutes said early target detection that is received at time $t_d$. Having identified the series of target reflections, it is possible to readily derive therefrom the respective range to targets (on the basis of the elapsed time between the transmitted pulses, as retrieved from the database and receipt of said reflections).

Thereafter, the range-based TSE is successively applied in step 63, in a manner which will be further expounded upon below, so as to bring about a fairly accurate target state estimation at time $t_d$. It is assumed that the back-propagation and range estimation procedures (steps 62 and 63) require only a fraction of a second and by the time that a succeeding reflection is obtained (at timing $t_{d+1}$), steps 62 and 63 have both been terminated.

Having obtained the target state estimation for $t_d$, the tracker system can proceed in a normal "forward" target state estimation as stipulated in step 64, i.e. to identify the next reflection (at $t_{d+1}$) from target (i.e. 308 in FIG. 6). This is easily accomplished on the basis of the previous range (which corresponds to reflection 306), and the transmission timing of the pulse from which the reflection originates.

Having encountered the next target reflection at timing $T_{d+1}$, it's corresponding range is fed along with the appropriate LOS measurement (at timing $T_{d+1}$), as delivered from the PIR electro-optical seeker, and self state data (at timing $T_{d+1}$) as delivered from the IMU, to the range-based TSE, for obtaining target state error estimation which, in turn, is utilized (by the kinematic module 18, see FIG. 2) for obtaining updated target state estimation, and so forth.

The advantages brought about by utilizing the above technique will now be explained with reference to a numeric example.

Thus, assuming that the transmission of the LRF at time $t_1$ occur at a range of about 4.5 km from the target, and further assuming that early target detection occurs at time $t_d$ which correspond to about 3.7 km from target, and further assuming that the back-propagation procedure as well as range-based TSE which, as recalled, give rise to improved target spatial position estimations, terminates before $t_{d+1}$ i.e. more than 3.5 km from target. Thus, at about 3.5 km from the target, fairly accurate estimations as to the target's spatial position are available leaving thus ample time for the inherently slow steering mechanism to follow suit and to successfully home onto the target. Conversely, utilizing the known techniques will give rise to first target detection at about 3 km from target and only after the interceptor further advances the target, the range determination will converge to accurate values. At this late stage, however, the probability of missing the target is not negligible.

Figure 7A:
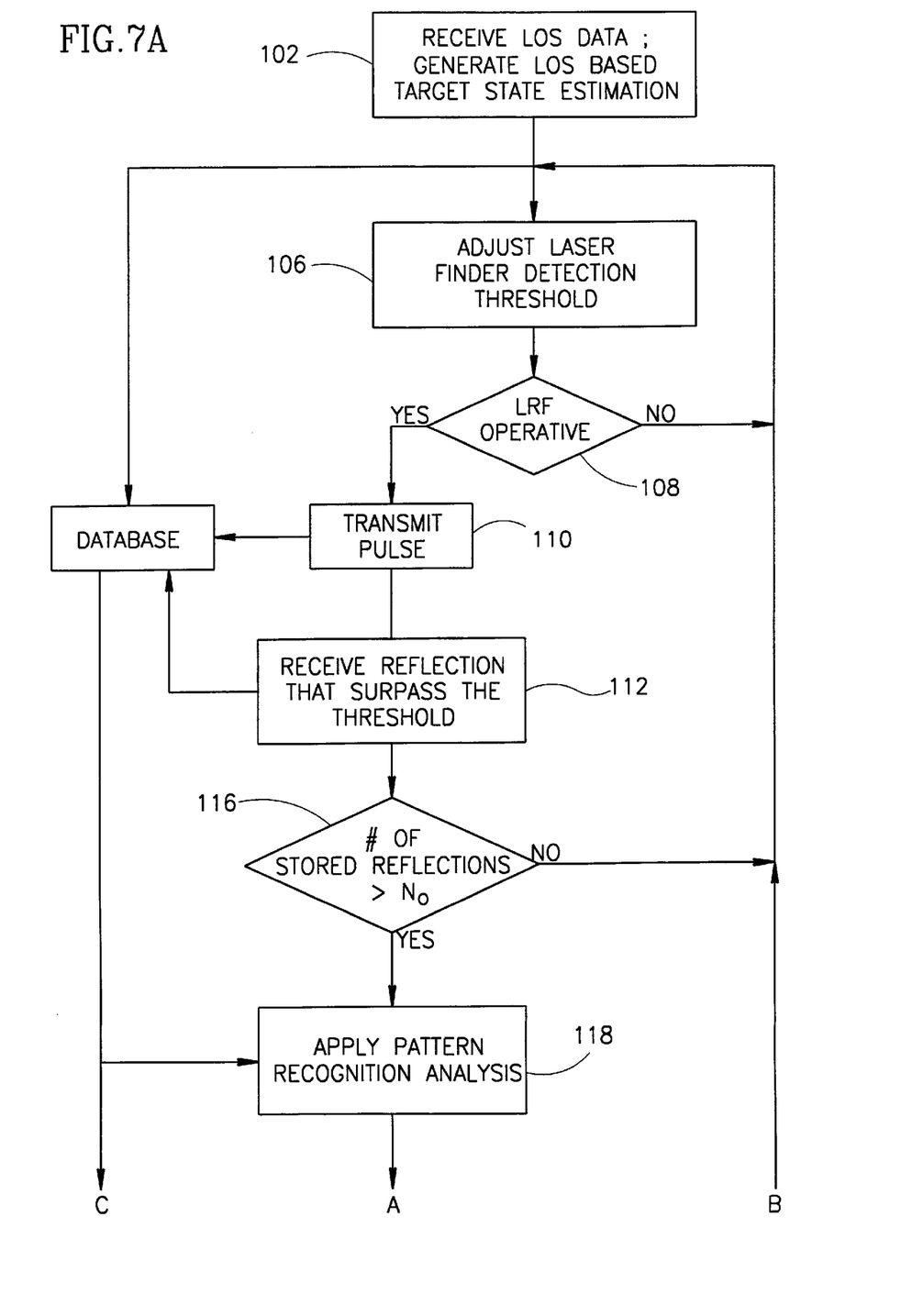
FIGS. 7a–b illustrate a schematic flow chart of a typical sequence of operation of a tracker system, according to one embodiment of the invention.
Figure 7B:
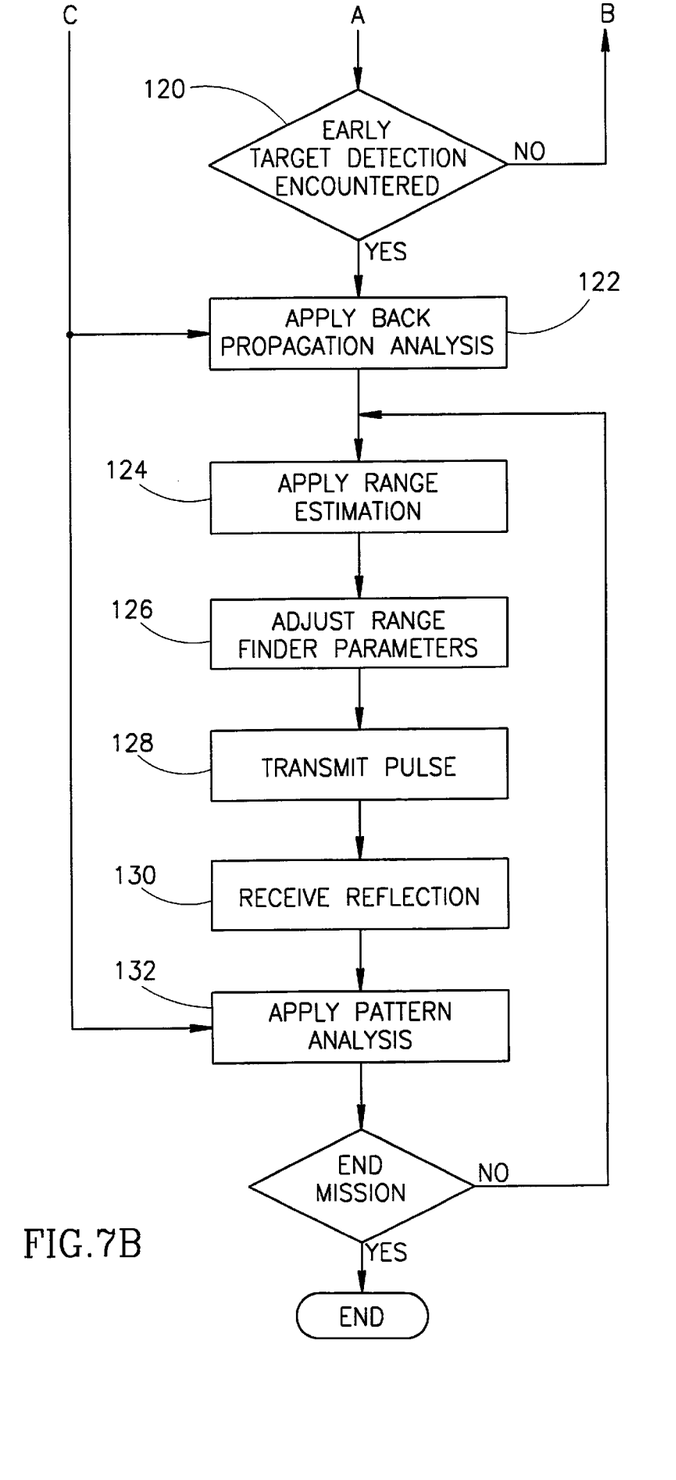

For a better understanding, there follows now a detailed description, with reference also to FIGS. 7*a–b*, of target state estimation according to one embodiment of the invention.

Thus, The LOS measurement is obtained from passive tracking means 12 (step 102), and is stored in LOS database 14 (step 104). Next, when the laser range finder module 28 becomes operative, and after having adjusted the detection threshold to a desired value (steps 106 and 108, respectively), the transmitter of the laser finder is activated for transmitting pulsed radiation. (step 110)

In the case of intercepting TBM, the laser finder starts to transmit at a range of about 5 km. The transmitted pulses are stored in the reflection database 32, and likewise the received reflections (most of which, as recalled, stand for noise) are also stored in the reflections database (step 112 and 114).

After sufficient reflections are stored in the reflection database, (step 116) the PR analysis is applied (step 118), e.g. according to the specified Hough technique. The output of the Hough algorithm is an estimation of the range-to-target (i.e. the resulting "early target detection" status that is brought about by following the 'Y' arrow in enquiry 120) and of the closing velocity $V_c$ at time $t_D$. The specified operations are generally covered by step 61 in FIG. 5.

After having encountered a target detection event, there commences a back propagation procedure (step 122), which is generally covered by step 62 in FIG. 5.

Figure 8:
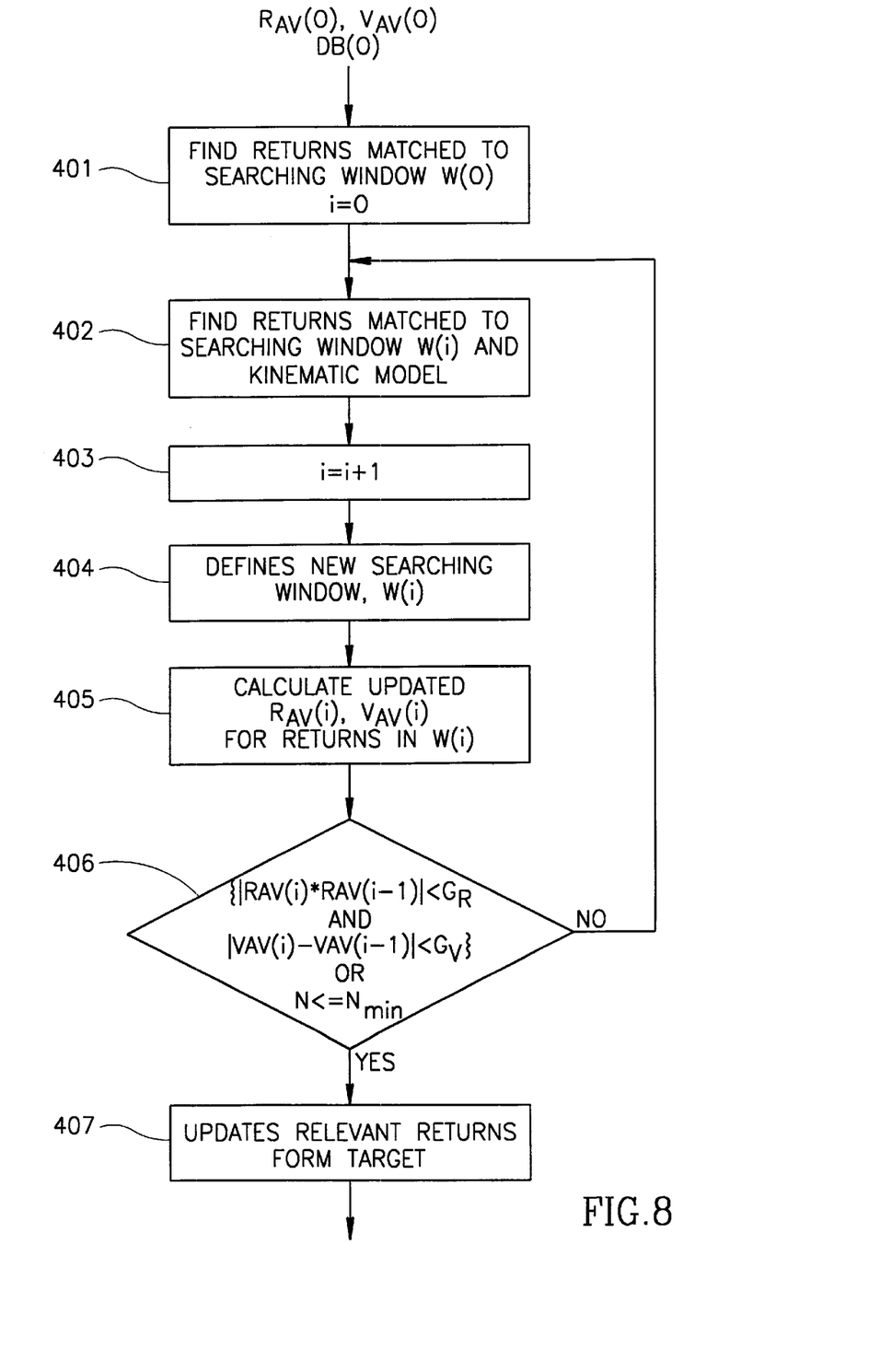
FIG. 8 is a schematic block diagram illustrating a typical back propagation procedure, according to one embodiment of the invention.

There follows a specific description of a typical, yet not exclusive, back-propagation procedure, by referring also to FIG. 8. Thus, the output of the Hough algorithm i.e. range to target (designated Rav(0)), closing velocity (designated (Vav(R0)), are utilized in step 401 for classifying the reflections in the specified refection database, which comply with the specified range and closing velocity data.

To this end, a preliminary search window W(0) is defined which window includes target reflections as well as noise reflections. The window dimensions are determined according to the resolution of the previous processing stage, i.e. in the case under consideration, according to the Hough technique.

Next, there commences an iterative processing for gradually decreasing the search window size W(0) whilst discarding all those reflections which do not comply with the kinematic target behavior model (402).

This test is realized by examining the error ($E_i$) between the estimated value of the kinematic model $\hat{r}_i$ and the actual range data $r_i$.

The so obtained errors $E_i$ are averaged so as to obtain E(0), utilizing linear or non linear criterion, such as median filter.

Next, each $E_i$ is compared to the average error E(0), and in the case of discrepancy that exceeds a given threshold the reflection that correspond to said $E_i$ is discarded from the current search window, and the remaining reflections define new search window (403).

Now, from the remaining reflections, new range and closing velocity are computed (405).

Step 406 defines a completion criterion for the iterative calculation, e.g. small or no change in calculated range and/or closing velocity as compared to their respective values in the previous cycle of calculation, or that the number of remaining reflections drops below a predetermined number.

Having met the completion criterion control is transferred to step 407 (i.e. completion of the BP phase), or otherwise, control is again transferred for step (402).

Attention is again drawn to FIG. 7. On the basis of this "historic" range determinations ($R(t_1), R(t_2) \ldots, R(t_d)$), as obtained from the back-propagation procedure, the target range estimation as referred to in FIGS. 1 and 2 is activated (step 124), utilizing to this end also corresponding LOS measurement and self state data as retrieved from the respective self state and LOS databases 14 and 25.

The target state estimation, by utilizing the range-based TSE will now be described in greater detail. Thus, a preliminary, and obviously inaccurate target state estimation $\hat{x}$ (valid for $t_1$) is provided by the passive tracking module 12 (and in particular by the LOS based TSE module thereof), and is fed to the kinematic model 18 so as to yield at the output 20 thereof $\hat{x}$ (valid for $t_1$), in compliance with algorithmic expression (1), above.

This preliminary target state estimation $\hat{x}$ is then fed to known per se geometric calculator module 50 which is further fed with IMU($t_1$) data, i.e. interceptor's self state at time $t_1$, as obtained from the self-state database 25.

The geometric calculation model yields at output 52 thereof the target state estimation, however in terms of LOS and range (designated as $\hat{z}$). The latter is fed to adder 54 as a negative feedback to $LOS(t_1)$ (as retrieved from the LOS database 14) and $R(t_1)$ (as retrieved from the reflection database 32), so as to give rise to target state error in terms of $\delta LOS$ and $\delta R$ (designated collectively as $\delta \hat{z}$). The latter is fed to the range-based TSE 56, e.g. Kalman based estimator disclosed in Bar-Shalom, ibid., so as to bring about target state error in terms of position, velocity and acceleration ($\delta P, \delta V, \delta A$, respectively—designated collectively as $\delta \hat{x}$).

$\delta \hat{x}$ is then fed to the target kinematic behavior model module 18, in order to obtain yet further improved target state estimation, in the following manner: $P(t_{k-1})$ (i.e. $P(t_1)$), is replaced by $P(t_1)+\delta P(t_1)$; likewise, $V(t_{k-1})$ (i.e. $V(t_1)$) is replaced by $V(t_1)+\delta V(t_1)$; and $A(t_{k-1})$ (i.e. $A(t_1)$) is replaced by $A(t_1)+\delta A(t_1)$, all in algorithmic expression (1).

Now the value $t_k-t_{k-1}$ is calculated (i.e the time interval between consecutive transmitted signals), and a propagate of the target to $P(t_2)$ is obtained. $P(t_2)$ stands in fact for $\hat{x}$ being the updated target state estimation.

In the following iteration, the so obtained target state $\hat{x}$ is fed to geometric calculator 50 along with the succeeding $IMU(t_2)$ so as to obtain a target state estimation in terms of LOS and R i.e. $\hat{z}$ (valid for $t_2$), which in turn is fed to adder 54 as a negative feedback against $LOS(t_2)$ and $R(t_2)$, as extracted from the respective LOS and reflection database, so as to bring about new state error $\delta \hat{z}$. The latter is fed to range based TSE 56 so as to bring about new target state error $\delta \hat{x}$ that is fed to the kinematic model module 18 for producing, in the manner specified, updated state target $P(t_3)$.

This iterative calculation is continued until all the range estimations $R(t_1)$ to $R(t_D)$ (and, of course, their corresponding $LOS(t_1)$ to $LOS(t_D)$ and $IMU(t_1)$ to $IMU(t_D)$, are exploited, thereby bringing about an updated target state estimation valid for $t_D$, i.e. $P(t_D)$.

It should be noted that whilst, as specified before, the PR analysis and the back propagation analysis succeed in identifying the reflections which are suspected to be scattered from the target, these procedures cannot guarantee foolproof results, i.e. even from those classified as target reflections, they may still be one or more that are in fact being noise(s).

Thus, other possible mechanism for filtering out the remaining noise, may be incorporated between the adder 54 and range-based estimator 56. The latter mechanism compares the so obtained target state error $\delta \hat{z}$ against a given threshold value. In the case that the absolute value of the target state error $\delta \hat{z}$ surpasses said threshold value, it is assumed as originating from noise and not as a valid target reflection, and consequently it is discarded. The computation then proceeds to the next cycle (utilizing the following R,LOS,IMU values).

Those versed in the art will readily realize that other mechanisms may be utilized in addition or in lieu of the latter mechanism, all as required and appropriate.

It should be noted that the LOS, IMU and R values may be utilized according to the accurate timing in which they were acquired (or calculated), however this is by no means obligatory and in some or all of the specified calculation procedures described above, approximated values thereof may be utilized, e.g. aligned to the resolution of transmitted pulses, as depicted in FIG. 6.

Whenever required, other mitigating considerations may be utilized to obtain fast convergence towards accurate target state estimation, according to the invention. Thus, by way of non limiting example, the range based TSE 56 can assume that the target flies along an essentially straight trajectory section. The latter data may be derived, e.g. from target flight characteristics database 58.

The operation of range based TSE under these circumstances, is generally known per se as described e.g. in "Ake Bjork, "numerical methods for least squares problems", Society for Industrial and Applied Mathematics", 1996.

Turning now to general step 64 (in FIG. 5), the latter concerns "forward" processing and is elaborated in steps 128 to 132, of FIG. 7b. Step 126 concerns known per se procedure for adjusting the LRF to receive reflections from desired interval of ranges.

Step 64 refers to "forward" processing since unlike the previous steps it processes on-coming (rather than historic) reflection signals, so as to obtain real-time target state estimations Thus, a new pulse is transmitted (128) by the LRF and the received reflection (130) undergoes PR analysis (132) in the manner specified so as to decide whether it is a target reflection, or noise.

The operation of the PR analysis is, at this stage, less error prone bearing in mind that the timing of next target reflection can be anticipated with a relatively high degree of certainty on the basis of, e.g.:

(i) the timing of pulse transmission;
(ii) the fairly accurate estimated range and closing velocity; and possibly also based on
(ii) the relatively large magnitude of received target reflection as compared to clutter noise, due to the ever decreasing range-to-target as the interceptor keeps approaching the target.

Having obtained new range-to-target that is associated to the new target reflection, it is utilized along with the corresponding LOS and self state (IMU) measurements, for obtaining a real-time updated target state estimation (steps 124 126).

This procedure continues, essentially until successful target homing and interception is accomplished.

It should be noted that the invention is by no means bound by the specific architecture depicted in the drawings. Thus, by way of non limiting example, the various database modules, illustrated as separate blocks may be realized, of course as one database. By way of another non limiting example, the distinction of target refection from noise is based on the magnitude of the received reflection as explained before, and also on the waveform thereof.

What is claimed is:

1. An interceptor fitted with a target tracker unit, comprising:

a passive infrared tracker capable of sensing infrared radiation (IR) emitted from a flying target and being responsive to said sensed IR radiation, for generating a succession of Line of Sight (LOS) and/or LOS rates signals that are stored in a database;

self state means capable of proving a succession of an interceptor's self state data;

an electro-magnetic range finder that includes a transmitter assembly for transmitting pulsed radiations and a receiver assembly for receiving reflections that surpass an adjustable detection threshold;

said electro-magnetic finder being configured to operate at a first detection threshold for receiving reflections of relatively low magnitude and storing said reflections in said database;

a target reflection detection module communicating with said database, for detecting target reflections from among those stored in said reflection database;

an estimator that includes a range-based target estimator for calculating target state estimations on the basis of at least said detected target reflections, said LOS signals and said self state data, thereby facilitating early steering of the interceptor for duly homing said interceptor onto the target.

2. A tracker unit according to claim 1, wherein said passive infrared tracker further includes a LOS based target state estimator, which on the basis of at least said LOS signals, is capable of generating target state estimations for use at least by said target reflection detection module.

3. A tracker unit according to claim 1, wherein said target state estimations include target position and target velocity.

4. A tracker unit according to claim 3, wherein said target state estimations further include target acceleration.

5. A tracker unit according to claim 1, wherein said target state estimations include range and either or both of LOS measurements and LOS rates measurements.

6. A tracker unit according to claim 1, wherein said self state data is provided by an on-board self state unit.

7. A tracker unit according to claim 1, wherein said self state data is provided by an external self state means.

8. A tracker unit according to claim 1, wherein said electro-magnetic range finder comprises a laser range finder.

9. A tracker unit according to claim 1, wherein said target reflection detection module, comprises:

a pattern recognition analyzer being responsive to at least said reflection database for detecting sought reflections that were scattered from the target, said detection being based on at least expected closing velocity and expected range.

10. A tracker unit according to claim 9, wherein said pattern recognition analyzer utilizes the Hough technique.

11. A tracker unit according to claim 9, further including a back-propagation analyzer being responsive to the detection of said sought reflections, for picking-up, from among the reflections stored in said database, previous reflections that were scattered from the target so as to obtain a series of reflection to target and to derive therefrom a series of respective ranges-to-target indications.

12. A tracker unit according to claim 1, wherein said range-based target state estimator comprises a Kalman filter estimator.

13. The tracker according to claim 1, wherein said range estimator is further responsive to target behavior constraints.

14. The tracker unit according to claim 13, wherein said constraints include that the target flies along an essentially straight trajectory section.

15. The tracker unit according to claim 1, in which said estimator further includes a kinematic target behavior model that complies with the following algorithmic expression:

$$P(t_K)=P(t_{K-1})+V(t_{K-1})\cdot(t_K-t_{K-1})+\tfrac{1}{2}A(t_{K-1})\cdot(t_K-t_{K-1})^2.$$

16. For use in an interceptor, a tracker unit according to claim 1.

17. An interceptor fitted with a tracker unit according to claim 1, adapted to intercept tactical ballistic missile.

18. The interceptor of claim 17, being an air-to-air missile.

* * * * *